United States Patent [19]

Tsunekawa et al.

[11] 3,884,584

[45] May 20, 1975

[54] AUTOMATIC SWITCHING SYSTEM FOR PHOTOMETRIC PORTIONS

[75] Inventors: Tokuichi Tsunekawa; Takashi Uchiyama, both of Yokohama, Japan

[73] Assignee: Canon Kabushiki Kaisha, Japan

[22] Filed: Nov. 19, 1973

[21] Appl. No.: 416,802

[30] Foreign Application Priority Data

Nov. 29, 1972 Japan.............................. 47-119617

[52] U.S. Cl................ 356/226; 250/214 P; 354/31; 354/60
[51] Int. Cl.............................................. G01j 1/16
[58] Field of Search............. 250/214 P; 354/31, 60; 356/226

[56] References Cited

UNITED STATES PATENTS

| | | | |
|---|---|---|---|
| 3,518,438 | 6/1970 | Hart et al.......................... | 356/226 X |
| 3,529,893 | 9/1970 | Holle et al......................... | 354/31 X |
| 3,670,637 | 6/1972 | Mori et al.......................... | 354/60 X |
| 3,761,183 | 9/1973 | Yuasa et al...................... | 356/226 X |
| 3,781,119 | 12/1973 | Mori................................. | 354/24 X |

*Primary Examiner*—Archie R. Borchelt
*Attorney, Agent, or Firm*—Toren, McGeady and Stanger

[57] ABSTRACT

An automatic switching system for photometric portions of an object, comprising the first light receiving device exclusively for light flux from central portion of the object, the second light receiving device for light flux from portions other than the central portion thereof, both of said devices respectively having at least a light receiving element of photo-electromotive force type. The system further comprises, connecting means for connecting said respective elements in series, a control circuit means for said connecting means with its output, said control circuit means having amplifier circuit to form output signal corresponding to partial brightness of the object, including switch means, detecting means, indicating means and the like.

8 Claims, 10 Drawing Figures

PATENTED MAY 20 1975 3,884,584

AUTOMATIC SWITCHING SYSTEM FOR PHOTOMETRIC PORTIONS

BACKGROUND OF THE INVENTION

Usually, in case the brightness of an object or the like is not uniform, for instance the brightness of its central portion is higher than that of peripheral portion or vice versa, when the difference of brightness of each portion are small, upon average photometry of the object, its photometric error will not appear so much.

The term of average photometry used herein is to be understood, for instance, as a method for obtaining a value of photometry by means of the output of light receiving element, in which total light from the object is received by single light receiving element, or a method for average addition of electric output of light receiving elements, by providing a plurality of light receiving elements which receive light flux of each portion of the object, or the like and various such methods are used conventionally.

But, in case the brightness of each portion of an object is extremely different from each other, there is disadvantage that any precise photometry cannot be expected. For instance, when the brightness of peripheral portion of the object is by far higher than that of central portion, the light receiving element for photometry is influenced by the brightness of light flux on the peripheral portion and the photometry is effected not for the brightness of central portion but merely for the brightness of peripheral portion. In this case, the value of photometry shows merely the brightness of peripheral portion of the object, and for instance, when the exposure conditions of a camera are set on the basis of this value of brightness, appropriate exposure values are shown for the peripheral portion of the object, however, no appropriate exposure may be given for the central portion. In many cases, the portions on which photometry is to be effected exist at central portion within the field of photometry mostly, so that such a photometric system could not attain any precise measurement and was not appropriate as a photometric system for general use.

To eliminate disadvantages of said average photometric system, it has been known so called a partial photometric system which measures merely main portion in the object. In such a partial photometric system, at a point where the photometry can be effected for the most desired portion to be measured, so that an appropriate photometric value may be obtained for said portion, however, in case the brightness of object is not uniform, an appropriate value may be obtained merely for the portion on which the photometry is effected, but there is a disadvantage that no accurate photometric value may be obtained for other portions.

A method, which has been proposed to solve problems of usual systems, is a circuit for exposure meter arranged in such a manner that light flux of each portion of the object is received by means of a plurality of light receiving elements of photo-conductive type and said light receiving elements are connected in series, thus an output for photometric value is obtained by said series output. In such a circuit for exposure meter, the output of light receiving element group effects the photometry of lowermost brightness portion of the object and yet effects the photometry by the output of any element continuously, however, there is accompanied by disadvantage at the same time that bad influence is given by other elements to the element which determines the photometric value.

This means that in case of photo-conductive element, when central portion of the object is particularly dark, the photometric value is obtained dependently upon the apparent resistance of the photo-conductive element, which receives light flux of said portion, based on the influence of said portion, but at the same time, the photometric value is determined by the ratio of potential division to the apparent resistance of other photo-conductive element. As the result thereof, for instance, regardless of particular desire of photometry on the central portion, it results in receiving the influence of light flux of other portions than of the central portion, thus it is impossible to obtain any precise photometric value.

To eliminate such disadvantage, a switching system is proposed as such that the light flux of object on its central portion is received by one of two photo-conductive elements and the light flux of object on its peripheral portion is received by another photo-conductive element, and when the difference of quantities of incident light between the output of both elements become more than a certain value, switching to any one element is effected by an electronic circuit. Thus said disadvantage is eliminated, however, an exclusive circuit for switching the elements must be used together, so that the circuits become complex, resulting in higher manufacturing cost.

SUMMARY OF THE INVENTION

This invention relates to an automatic switching system for photometric portions, wherein the photometric portions of an object may be automatically switched according to the brightness distribution of the object.

It is an object of the invention to eliminate above mentioned disadvantages of usual systems and to provide an automatic switching system for photometric portions, wherein each portion of the object is respectively made as a light receiving element and by utilizing the characteristic of photoelectric current for incident light of a photoelectric switching element, automatic switching of photometric portion is effected by the element itself.

Another object of the invention is to provide an automatic switching system for photometric portions having an indicator for indicating photometric portions of the object which are to be switched automatically.

Other objects of the invention will be apparent from embodiments described in details as under.

According to this invention, as photo-electric elements, photo-electromotive force elements, for instance, photo-diodes such as silicon blue cell and the like are used, and these elements are used as current modes, i.e., their output current are used to obtain photometric value. Particularly, they are formed by connecting a plurality of elements in series, so that the output current of each element is decided only by the minimum output current, i.e., by the output of any one element, and almost no influence of the output of other elements is exerted. Thus, by utilizing such a merit, the system is so formed that the desired photometry particularly of dark portions of the object is effected.

DESCRIPTION OF THE PREFERRED EMBODIMENTS

Figure 1A:
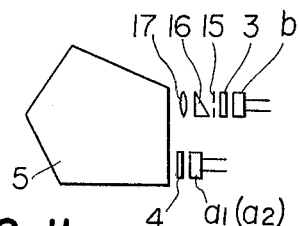
FIG. 1 (a), (b) and FIG. 2 show examples for arrangement of photoelectric switching elements in case the invention is applied to TTL single-lens reflex camera.

Referring now to the embodiments shown in the drawings, the present invention will be described in details.

Figure 1B:
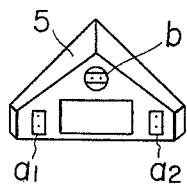
Figure 2:
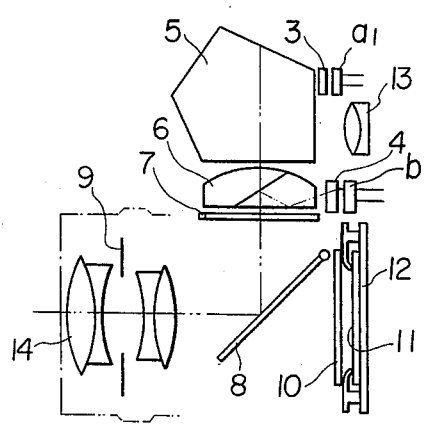
Figure 3:
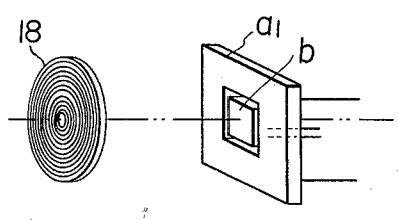
FIG. 3 shows a similar view to the above in case the invention is applied to a camera of external photometric system.
Figure 4A:
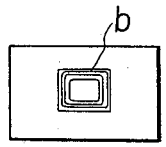
FIG. 4a and b are views showing examples of photometric portions.
Figure 4B:
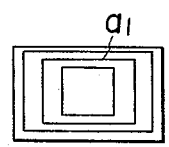

FIGS. 1, 2 and FIG. 3 show examples of arrangement of photoelectric switching elements $a1$, $a2$ and $b$ of photoelectromotive force type of silicon blue cell and the like, in case the invention is applied to TTL single lens reflex camera in the former figures and to a camera of external photometric system in the latter figure respectively. Herein, $a1$ and $a2$ denote photoelectric switching elements for average photometry and $b$ denotes a photoelectric switching element for central portion photometry. 3 and 4 denote sensitivity adjusting members (ND filter or aperture) of each element $a1$, $a2$ and $b$, 5 denotes a pentagonal prism, 6 a condenser lens having a translucent lens at its central portion, 7 a focusing screen, 8 a quick-return mirror, 9 a diaphragm, 10 a shutter screen, 11 a film, 12 a push plate, 13 an eyepiece, 14 a photographing lens system, 15 a field stop for limiting the photometric portion of element $b$, 16 a prism for centering the photometric portion, 17 a condensing lens, and 18 a condensing Fresnel lens respectively.

Figure 5:
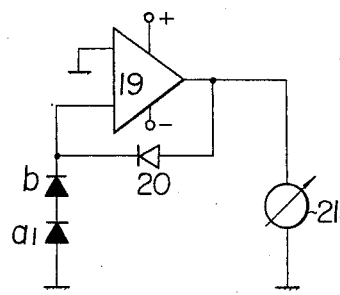
FIG. 5 and FIG. 6 are electric circuit diagrams.
Figure 6:
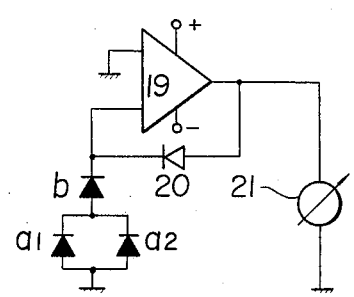
Figure 7:
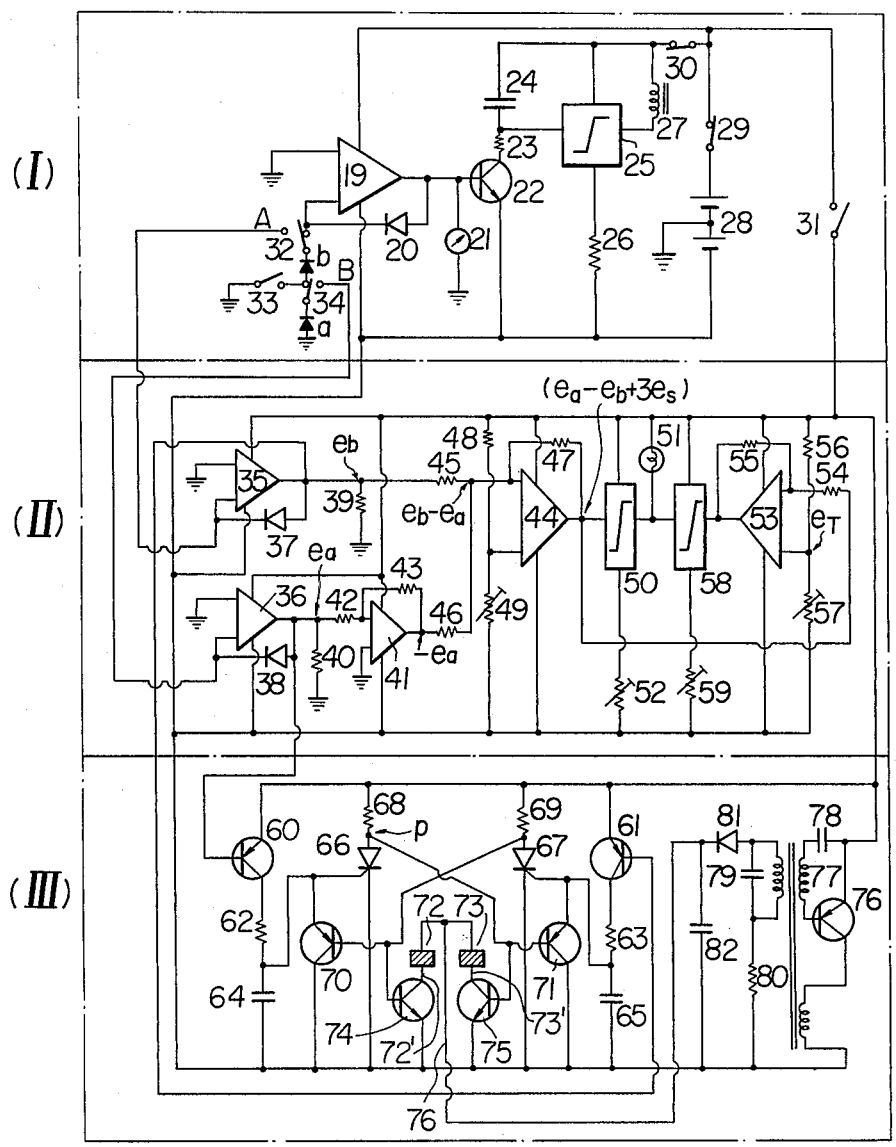
FIG. 7 is an electric circuit diagram for electronic shutter of a camera, to which the photometric system according to the invention is applied.

This invention contemplates to provide a photometric system by using the elements $a_1$, $a_2$ and $b$ arranged as mentioned above, and various embodiments thereof are shown in FIG. 5 to FIG. 7 inclusive. And, in the circuit exemplified in FIG. 5, the light receiving elements arranged as shown in FIG. 2 and FIG. 3 are used, and in FIG. 6, the light receiving element arranged as shown in FIG. 1 is used. In FIG. 5, the elements $a_1$ and $b$ are respectively connected in series and connected in the input of operational amplifier circuit 19. In feedback circuit between input and output of the amplifier circuit 19, a logarithmic compression diode 20 is connected and in the output circuit thereof, a meter 21 for indicating the measured value is connected.

In the above composition, at the time of photographing, for instance, when an object having low brightness lies at central portion and an object having high brightness lies at peripheral portion, the current $Ib$, which is to flow into the element $b$ for photometry on central portion, becomes smaller than the current $Ia$, which is to flow into the element $a1$ for the average photometry. Since both of elements $a1$ and $b$ are connected in series, the current flowing through the logarithmic compression element 20, i.e., the output, will be limited by the current $Ib$ flowing through the element $b$, so that the output of the element $b$ will be indicated on the meter 21. Conversely, when the central portion is bright and the peripheral portion is relatively dark, the output will be limited by the element $a1$ and the output of the element $a1$ will be indicated on the meter 21. Consequently, it is found that the photometric portion is automatically switched according to the brightness distribution.

When an exposure control circuit is connected after the system according to this invention, an exposure control circuit provided with automatic switching system for the photometric portion may be simply realized. In practice, it is preferred that the sensitivity adjusting members 4 and 3 before the elements $a1$ and $b$ are adjusted to give these elements suitable difference of sensitivity and to select suitably the level for switching of the photometric portion.

FIG. 6 shows another embodiment, to which the system according to this invention is applied. The difference between this embodiment and the embodiment shown in FIG. 5 is that two elements $a1$ and $a2$ for photometry on peripheral portion are connected in parallel and these are connected in series with the element $b$ for photometry on central portion. Since the elements $a1$ and $a2$ are respectively arranged on right and left sides of the eyepiece of pentagonal prism 5 as shown in FIG. 1(a) and (b), right and left portions of light image of the object are received by both elements and the average photometric output may be obtained by the output of parallel connection of both elements. The rest is entirely similar to FIG. 5, so that explanation thereof will be omitted.

FIG. 7 shows an example of electric circuit, when this invention is applied to the exposure control of a camera, wherein (I) is an exposure control circuit, (II) an alarm circuit for difference of brightness and (III) an indication circuit for photometric portion.

In FIG. 7(I), 22 is a transistor for expanding the signal, which is obtained by compressing the photoelectric current of the photo-electromotive force elements $a$, $b$ by means of the logarithmic compression element 20, 23 is a resistance, 24 an integration condenser for time control, 25 a Schmidt trigger circuit, 26 a resistance for setting the trigger level of 25, 27 a time magnet, 28 a voltage, 29 a main switch for exposure control circuit preliminarily connected prior to the photographing. 30 is a switch interlocking with a member such as shutter button or the like which is movable at the time of photographing and also a switch which reduces the consumption of electric power of photometric circuit at the time of photometry. It is already described that this exposure control circuit is controlled by one of the photo-electromotive force elements $a$, $b$ having less photo-electric current, 31, 32, 33 and 34 are switches which are connected when the photometric portion or the difference of brightness is wanted to know and four switches are interlocking to be connected or changed over entirely to opposite side as shown in the drawing. It is another object of this invention that all of the switches 31, 32, 33 and 34 are changed over to opposite side shown, cutting off the photo-electromotive force elements $a$, $b$, comparing the photo-electric current of each element, thus effecting the indication of photometric portions and the alarm for brightness difference of the object.

FIG. 7(II) is an alarm circuit for brightness difference of the object, 35, 36 are operational amplifiers for amplifying each photo-electric current of the photoelectromotive force elements $a$, $b$, 37, 38 are logarithmic compression elements for obtaining arithmetical serieslike output to the logarithm (EV value) of the brightness of object by logarithmic compression of the photoelectric current of the elements $a$, $b$. 39,40 are load resistances. Let the output voltages of the operational amplifiers 35, 36 be $e_b$, $e_a$, the $e_a$ is converted to $-e_a$ by an operational amplifier 41 and resistances 42, 43 for output inversion at an output terminal of the amplifier, and further added by an operational amplifier 44 and resistances 45, 46, 47, 48, 49. For brevity's sake, the resistance of operational circuit is denoted by R. Hereupon, let the voltage for setting of the level of an operational amplifier at a junction of resistances 48 and 49 be $e_s$, the output voltage of the operational amplifier 44 is $(e_a-e_b) + 3e_s$ and the $3e_s$ is bias level, and when the $(e_a-e_b)$ voltage of more than a certain value is generated thereon, a Schmidt trigger circuit 50 is actuated to light an indication lamp 51. 52 is a resistance for setting a trigger level of the trigger circuit 50. In this case, lighting of the alarm indication lamp is effected when the brightness of peripheral portion is more than a certain value compared with the brightness of central portion. Inversely, when $(e_b-e_a)$ is more than a certain value, namely the brightness of central portion is more than a certain value compared with the brightness of peripheral portion, the alarm indication lamp 51 is lighted by the circuit of 53 to 58. When the alarm indication lamp 51 is lighted, it is a case that the difference of brightness between central and peripheral portions (central portion photometry and average photometry) is very large, thus the photographer's attention is called to the brightness distribution of the object.

53 is an operational amplifier for conversion, 54, 55, 56, 57 are resistances and when $e_T$ denotes a voltage for setting the level of the operational amplifier 53 at a junction between resistances 56 and 57, the output voltage of the operational amplifier 53 becomes $(e_b-e_a) + (2e_T - 3e_s)$, and the $(2e_T - 3e_s)$ is bias level and when a $(e_b-e_a)$ voltage of more than a certain value is generated thereon, the Schmidt trigger circuit 58 is actuated to light the lamp 51. 59 is a resistance for setting trigger level of the Schmidt trigger circuit 58.

FIG. 7(III) is a circuit for the indication of photometric portions, and when the photo-electromotive force elements $a$, $b$ are connected in series, exposure control is effected by an element having smaller photoelectric current, so that the circuit is such that the quantity of photo-electric current of the photo-electromotive force elements $a$, $b$ are distinguished to indicate a photometric portion having smaller photo-electric current. 60, 61 are transistors, 62, 63 resistances, 64, 65 condensers for integration, 66, 67 thyristors, 68, 69 resistances, 70, 71 switching transistors for indication, 72, 73 liquid crystal indicators for indication of photometric portion, 74, 75 transistors for driving of liquid crystal, 76 to 82 boosting circuits for driving of liquid crystal, 76 a transistor, 77 a coil, 78, 79 condensers, 80 a resistance for facilitating oscillation, 81 a diode, and 82 a condenser.

The working of this circuit will be explained as under.

For instance, when the output of the photoelectromotive force element $a$ is larger than that of the photo-electromotive force element $b$, the base electric potential of the transistor 60 is larger than that of the transistor 61. So that, the collector current of the transistor 60 is larger than that of the transistor 61, the thyristor 66 will attain to trigger level more quickly than the thyristor 67 to become "on". When the thyristor is turned on, the electric potential at a point P of the resistance 68 drops, the voltage between base and emitter of the transistor 71 increases, the transistor 71 become on, electric charge of the condenser 65 discharges instantaneously, electric potential of the condenser drops, thus the thyristor 67 never reaches the trigger level. Therefore, in the transistors for driving of the liquid crystals 72, 73, the transistor 74 becomes on and the transistor 75 becomes "off", the voltage is impressed on the liquid crystal 72, thus the photometric portion will be indicated in the finder.

Figure 8:
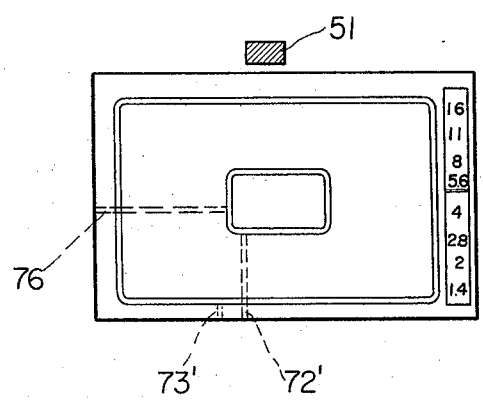
FIG. 8 shows a constructive view of a finder used together with the circuit shown in FIG. 7.

FIG. 8 is an example of the indication in a finder, in which the liquid crystals 72, 73 shown in FIG. 7 are arranged. An alarm indication lamp for the difference of brightness of the object is arranged outside of a frame for finder field, and in the finder field, a frame for central portion photometry on central portion and a frame for average photometry on peripheral portion are indicated by liquid crystals. This invention includes such features that the liquid crystals are utilized for indication of photometric portions, so that only in case of need the liquid crystals will scatter light and indication frame of the photometric portions comes up in white in the finder, but in case of exposure control, the switch is changed over and no voltage is impressed on the liquid crystals, so that the finder becomes transparent, thus no influence is given to the photometry of a camera.

It is of course that instead of the liquid crystals 72, 73, indication diode such as luminous diode or the like may be used to effect the alarm indication similar to the above.

When this invention is utilized the photometric portions of a camera may be automatically switched to the optimum condition according to the object, as well as brightness information of the object and information of the photometric portions of a camera may be obtained to effect the optimum photographing.

What is claimed is:

1. An automatic switching device of a photometry type in an automatic exposure control system of a camera comprising in combination;
    a first photosensitive means formed to sense only the light flux mainly emitted from the central portion of a scene object, said means having at least one first photosensitive element of a photo-electromotive power type for generating photoelectric current by sensing said light flux,
    a second photosensitive means formed to sense the light flux emitted from the peripheral portion of a scene object, said means having at least one photosensitive element of a photo-electromotive power type for generating photoelectric current by sensing said light flux,
    a connecting means for coupling said first and said second elements in series with each other,
    a control circuit means for coupling at the input thereof with said series-connected first and second elements, said circuit means having at least an amplifier circuit to form an output signal corresponding to the brightness of a scene object.

2. The automatic switching device according to claim 1, in which said first and second photosensitive means are photo-diodes.

3. The automatic switching device according to claim 1, in which said second photosensitive means comprises two elements which are connected in parallel.

4. The automatic switching device according to claim 1, in which said amplifier circuit is an operational amplifier circuit between whose input and output ends there is connected an element having a logarithmic compression characteristic.

5. The automatic switching device according to claim 1, including switching means for disconnecting said series-connected elements and for separately obtaining the output current of each element; first and second amplifier circuits, in which each element is respectively connected to the input thereof through said switching means; detecting means connected to said amplifier circuit outputs to detect the difference therebetween, and indicating means connected thereto for indicating when said difference exceeds a specified level.

6. The automatic switching device according to claim 1, including switching means for disconnecting said series-connected elements and separately obtaining the output current of each element; first and second amplifier circuits, in which each element is respectively connected to the input thereof through said switching means; a detecting circuit coupled to said amplifier circuit outputs to detect both outputs relatively; and at least two indicating means which are driven by said detecting circuit outputs.

7. The automatic switching device according to claim 6, in which said indicating means is a liquid crystal indicater arranged within a view finder.

8. The device according to claim 1 wherein the electric current in said series-connected elements is a function primarily of the more dimly illuminated photosensitive element.

* * * * *